3,531,338
PROPELLANT CONTAINING GUANIDINE PERCHLORATE-LITHIUM PERCHLORATE EUTECTIC IN HOMOGENEOUS PHASE WITH POLYMERIC BINDER
Joseph J. Byrne, Marblehead, Mass., assignor to Monsanto Research Corporation, St. Louis, Mo., a corporation of Delaware
No Drawing. Filed May 25, 1964, Ser. No. 370,757
Int. Cl. C06d 5/00
U.S. Cl. 149—19    6 Claims This invention relates to guanidine perchlorate, and more particularly, provides novel products derived from guanidine perchlorate and methods of making the same.

Perchlorate oxidizers with nitrogenous cations like guanidine perchlorate are especially advantageously adapted for use in solid rocket propellants. A metal perchlorate such as lithium perchlorate decomposes to the alkali metal chloride and oxygen. Non-gaseous products like the alkali metal chlorides in large amounts may produce undue wear of the rocket exhaust nozzle. Perchlorates with nitrogenous cations decompose to entirely gaseous products which are not erosive and, furthermore, add to the specific impulse of the propellant.

Guanidine perchlorate, however, is a detonation-sensitive material which is hazardous to handle. Its impact sensitivity by the Bureau of Mines Test (2 kilogram weight, 50 probability) is below 5 centimeters (cm.) The hazards involved in preparing propellants from it have therefore interfered with its utilization.

It is an object of this invention to provide novel products derived from guanidine perchlorate.

A particular object is to provide novel products derived from guanidine perchlorate which are less impact-sensitive than guanidine perchlorate.

Another object is to provide novel propellants comprising novel products derived from guanidine perchlorate, and methods of making the same.

These and other objects will become evident from a consideration of the following specification and claims.

It has now been found that guanidine perchlorate can be combined with lithium perchlorate to provide novel products of advantageous composition and properties, and that novel propellant compositions can advantageously be prepared from the stated products.

The novel combinations of guanidine perchlorate (GPC) and lithium perchlorate (LPC) provided by this invention include two eutectics and one double salt, of the following compositions:

| Weight | |  |
|---|---|---|
| GPC | LPC | |
| 70 | 30 | Eutectic, m. 126.5° C. |
| 66.8 | 33.2 | Complex salt, 4GPC.3LPC molar ratio m. 151°. |
| 57.5 | 42.5 | Eutectic, m. 110°. |

It is found that the stated combinations of lithium perchlorate and guanidine perchlorate are much less impact sensitive than guanidine perchlorate, and therefore much more safely handled. For example, under the same conditions of test noted above in which the guanidine perchlorate impact sensitivity is below 5 cm., that of the eutectic melting at 110° is above 120 cm.

It has further been established that the presently provided novel combinations of guanidine perchlorate and lithium perchlorate can advantageously be used for preparation of solid rocket propellants, including polymeric solid solution propellants.

Solid solution propellants are polymeric solid solutions of an oxidizer, in which the oxidizer and polymer are in the same homogeneous phase. It has been found that such solid solutions can be prepared by polymerizing a monomer in the presence of dissolved lithium perchlorate, with the resulting polymeric product including in solution therein at least about as much of the perchlorate as is in solution in the monomer mix. The polymeric solid solutions have several advantages. In the usual composite propellant, the plastic binder is a polymeric material serving as fuel, and oxidant to burn such fuel is combined with it as a separate phase of the heterogeneous product. The burning rate and stability to detonation are improved as the particle size of the oxidant is reduced, but milling the oxidant to reduce its particle size is hazardous. When the oxidant is in solid solution in the binder, intimate contact of fuel and binder is achieved without milling, and the solid solution has unexpectedly great resistance to detonation by impact.

Putting the oxidant into the same phase as the binder also raises the available solids loading of the composition. There is a limit to the solids loading for a given amount of binder, above which not enough binder will be available to form a continuous phase binding the discontinuous solids phase into a unitary structure. In the conventional composite propellant the solids phase includes oxidant for the binder. To the extent that the binder phase includes oxidant for itself, available solids loading is freed for the inclusion of other more energetic components. Thus propellants in which a polymeric solid solution of an oxidant is the binder have unusually low proportions of binder to total weight.

It has now been found that monomers can be polymerized in the presence of an oxidant amount of dissolved guanidine perchlorate/lithium perchlorate combinations as provided by this invention, to provide polymeric solid solutions of perchlorate oxidizer which can advantageously be employed in the production of rocket propellants.

The solubility of ammonium perchlorate in such systems has been established to be undesirably low, and while the ammonium perchlorate/lithium perchlorate eutectic has satisfactory solubility in such monomer systems, upon a slight deviation from the eutectic ratio, the ammonium perchlorate is thrown out of solution. Unexpectedly, it is found that the presently provided nitrogeneous perchlorate combinations do not suffer from this defect.

The present polymeric solid solutions wherein the polymer and perchlorate are in the same homogeneous phase have a number of advantages, as will be appreciated from the foregoing discussion. They provide impact-stable propellants comprising guanidine perchlorate without involving the hazards of milling guanidine perchlorate to reduce its particle size. The amount of non-gaseous decomposition products produced in burning the propellant is low. Propellants can be prepared with these solid solutions as binders in which the ratio of polymeric binder to total weight is as low as 10%, thus maximizing specific impulse.

If desired, particularly in view of their lack of impact sensitivity, the presently provided novel guanidine perchlorate/lithium perchlorate combinations can also be employed advantageously in other connections where perchlorates are useful, such as in the manufacture of composite propellants of the usual heterogeneous type.

Referring now in more detail to a description of the stated combinations of guanidine perchlorate and lithium perchlorate, the novel products provided hereby are the combinations of approximately the above-stated compositions, that is, the two eutectics and the double salt. A substantial departure from the stated ratios results in losing the advantages of the products.

These novel materials will be made by combining the respective perchlorates in appropriate amounts. To provide true eutectics, wherein the perchlorates are more intimately associated than in a physical mixture, the perchlorates should be combined in fluid state in a melt or solution.

A simple and direct method preferred for making the present products, including the two eutectics and the double salt, consists simply of fusing them together in the selected ratio.

The fused, solidified melt can be ground if desired to provide a free-flowing powder. The products are white crystalline materials which are relatively insensitive to impact.

To prepare conventional composite solid propellants from these materials, the particulate product can be combined with a polymer binder and with other usual propellant ingredients such as burning rate controlling additives, by usual techniques such as milling and the like. In such case, polymers useful as binders may include hydrocarbons such as polyethylene or a polybutadiene rubber, halogenated polymers like vinyl chloride, vinylidene fluoride and so forth.

Propellant compositions with advantageously reduced bind-to-total weight ratios can be prepared in accordance with this invention by polymerizing a monomer in the presence of an oxidant amount of a dissolved combination of guanidine and lithium perchlorates as provided by this invention, thereby providing polymeric solid solutions of an oxidant amount of the combination of a guanidine perchlorate and lithium perchlorates with polymer in the same homogeneous phase.

By solid solution is meant that the perchlorate and the polymer are homogeneously mixed and in the same phase to the extent that heterogenity therebetween is not evident on examination under an ocular microscope.

By a polymeric binder is meant a matrix comprising polymer having a molecular weight at least sufficient to make the polymer solid at room temperature. It is undesirable to have the molecular weight so high that the polymer is infusible and insoluble. Preferably the product will be sufficiently elastomeric to have a tensile strength of at least 50 pounds per square inch (p.s.i.).

The perchlorate must be anhydrous, containing less than about 0.5 mole-percent water, and in reference to it, it is to be understood that anhydrous perchlorate is meant.

By an oxidant amount of the perchlorate is meant enough to supply the combustion oxidation requirements of a significant portion, which will be at least about half the oxidation requirements, of the polymer.

The oxidation requirements of the polymer may be supplied largely by the lithium perchlorate content of the guanidine perchlorate/lithium perchlorate, combination. Lithium perchlorate, $LiClO_4$, decomposes to $LiCl$ and 2 moles of oxygen molecules per mole of perchlorate. Thus referring for example to oxidation of the polymers including $CH_2$ and like hydrocarbon units, if the C atom forms CO and H atoms form water respectively, as gaseous oxidation products, the consumption of oxidant is 0.5 mole of lithium perchlorate per mole of methylene units so oxidized. Under certain conditions, the hydrogen is not oxidized or is oxidized in part, but then a corresponding amount of metal is oxidized. Thus the ratio of lithium perchlorate polymer to supply the oxidation requirements will be at least about 0.5 mole per mole of reduced carbon atoms in the polymer. The guanidine perchlorate content of the combinations employed will supplement the lithium perchlorate in supplying oxygen for the oxidation requirements of the polymer to an extent depending on the amount of oxygen consumed in its own decomposition mechanism. In any case, to attain the benefits of this invention at least about half of the oxidation requirement of the polymer will be supplied by the dissolved combination of guanidine perchlorate and lithium perchlorate and lithium perchlorate in the same homogeneous phase as the polymer. Preferably all the oxygen requirement for the oxidation of the polymer is supplied by the dissolved perchlorate material, and still more preferably, more than half and desirably all the oxygen requirement of the total propellant composition is supplied by such perchlorate.

The present polymeric solid solution compositions may consist essentially or entirely of the polymer and the guanidine perchlorate/lithium perchlorate combinations. Such compositions are monopropellants which can be employed as such to produce propellant gases for rockets and the like by burning, and explosive forces on ignition in an enclosed space.

As will appear hereinafter, however, it is desirable to include other components in the composition. These may either be part of the same binder phase as the polymer, or part of the discontinuous solids phase combined with the binder. They may include fuels and oxidants, as further pointed out hereinafter. If these other compounds are fuels, they consume oxygen, and thus increase the total oxygen requirement of the composition. Where additional oxidant is included, the guanidine perchlorate/lithium perchlorate combination need not supply all the oxidant requirements of a composition, but to adapt the composition to propellant and fuel use, it is necessary that the composition include sufficient total oxidant to render combustion of the system self-supporting.

The quantity of perchlorate material desired in the final solid propellant composition will thus vary depending on the particular selection of ingredients. It may be up to about 80%, based on the total weight of the composition. It will be understood that substantially smaller amounts of the perchlorate material may be employed in effective compositions, and the amounts are often in the region of about 4 or 5 to 15 or 16 percent.

The polymerizable monomer system employed must polymerize without evolution of water, and dissolve at least an oxidant amount of a presently provided novel perchlorate combination.

The polymerizable monomer systems available which polymerize without evolution of water include (1) vinyl monomers, susceptible to addition polymerization, such as acrylamide; (2) polyfunctional monomer mixtures, in which the monomers react to form polymers, such as mixtures of a diisocyanate with a glycol or diamine; and (3) homopolymerizing monomers, polymerizing by mechanisms which may be described as self-condensation, such as caprolactam.

To possess solvent power for the perchlorate oxidizer, it is found that the monomer should be a compound having a functional group including a donor atom selected from the group consisting of O, S and N. Combinations of such groups such as an amide group

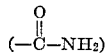

are especially favorable.

Thus in addition polymerization, the polymerizable monomer will be an olefin containing a hetero donor atom selected from O, S and N. Polymers containing carbonamide groups are preferred as the polymeric binder in the compositions of this invention, and accordingly a preferred olefin type is an olefinic carbonamide. For example, they may be polymers of acrylamide, methacrylamide, N-methylacrylamide, N-tert-butylacrylamide, N-tert-octylacrylamide, N,N-dimethylacrylamide, N,N-dipropylacrylamide, N - octylmethacrylamide, N - decylmethacrylamide, 1 - vinyl - 2 - pyrrolidinone, 3 - methyl-1-vinyl - 2 - pyrrolidinone, 3 - butenoic amide, and the like. References herein to "an" acrylamide are intended to include both those in which the only nonhydrocarbon component is the carbonamide side chain group, such as those just mentioned, and those including additional hetero atoms selected from N, O and S, such as N-methylolacrylamide, N - (2 - hydroxyethyl) acrylamide, 2-methylolacrylamide, N - acrylylmorpholine, N - methacrylylmorpholine and N - (2 - ethoxyethyl)acrylamide, N - (mercaptomethyl)acrylamide, 2 - (2 - ethylthioethyl)acrylamide and N - (tetrahydrothienyl)acrylamide, acrylic hydrazide, N-acrylylpiperazine, 2-(aminomethyl)acrylamide, 1 - cyanoacrylamide, N - (trinitroethyl)acrylamide and the like.

The polymers in products of this invention can also be obtained from olefinic monomers susceptible to addition polymerization which are free of carbonamide bonds, such as 1-methoxybutadiene, vinyloxyethanol, methyl vinyl ketone, methyl acrylate, tert-butyl acrylate, hexyl acrylate and decyl acrylate, methyl methacrylate, ethyl methacrylate, n-butyl methacrylate, allyl acetate, vinyl formate, vinyl acetate and vinyl stearate, vinyl methyl sulfide, 2-methoxyethyl acrylate, 2-methoxyethyl methacrylate, ethylene glycol dimethacrylate, butylaminoethyl methacrylate, butylaminoethyl methacrylate, N,N-dimethylaminoethyl methacrylate and the like. Mixtures such as acrylamide-2-methoxyethyl acrylate, acrylamide-vinyloxyethanol, acrylamide-acrylonitrile, acrylamide-allyl acetate, acrylamide-vinyl formate, and so forth, may also be used.

As mentioned above, interreaction of two polyfunctional monomers is another useful kind of polymerization system. One monomer will have functional groups including active hydrogen, which may be a dihydric alcohol like ethylene glycol or propylene glycol, an amino alcohol like 2-aminoethanol or 3-aminopropanol, or a diamine like trimethylenediamine, N,N'-dimethylhexamethylenediamine, cyclohexanediamine, 2,2'-diaminoethyl ether and sulfide, and so forth. The other polyfunctional monomer may be a diisocyanate such as hexamethylenediisocyanate or tolylenediisocyanate and the like, or a bis-azlactone such as phenylenebis(4,4-dimethyl-2-oxazolin-5-one), or diepoxide such as 3,4-epoxy-6-methylcyclohexylmethyl 3,4 - epoxy - 6 - methylcyclohexanecarboxylate, the bis (epoxypropyl) ether of 2,2-bis(4-hydroxyphenyl)propane, the bis(epoxy-exo-dihydrodicyclopentadienyl) ether of ethylene glycol, and so forth. The stated functional groups will be attached to polyvalent radicals which may be hydrocarbon, saturated aliphatic or aromatic unsaturated, or may include non-interfering hetero atoms such as O, N and S. The ratio of the monomers will be about such as to provide one active hydrogen functional group per functional group reactive to polymerize such group in the second monomer.

The self-condensing monomers polymerizing without evolution of water are illustrated by ε-caprolactam, 2-pyrrolidinone and like cyclic lactams, by isocyanates such as:

A diisocyanate such as hexamethylene diisocyanate or 4,4'-diisocyanatodiphenylmethane, optionally mixed with up to equimolar amounts of a monoisocyanate such as chlorophenyl isocyanate, in systems forming polyisocyanurates, and so forth.

Polymerization conditions for polymerizing a monomer in the presence of a dissolved guanidine/lithium perchlorate combination in accordance with this invention are generally those usual for polymerizing the selected monomer, provided the system is anhydrous and includes solvent for dissolving the guanidine/lithium perchlorate combination. Temperatures should be below decomposition temperatures of the reaction mixture components, and usually not above 200° C. A temperature above room temperature and below 100° C., such as about 85° C. is preferred. Atmospheric pressures are preferred, but the pressure may be subatmospheric, down to 0.1 mm. Hg, or superatmospheric, up to 5000 p.s.i. Depending on the monomer system, polymerization may be spontaneous at temperatures of operation or in some cases may be catalyzed by the perchlorate material. In cases where vinyl amides, such as acrylamide, are used, an inhibitor such as N-methyl morpholine may be used to prevent premature polymerization during the mix operation. Curing conditions can be reestablished by neutralizing the inhibitor with a neutralizing activator such as succinic anhydride. If needed, usual polymerization catalysts for the system may be used, such as diazoisobutyronitrile as a free radical source in vinyl polymerization, ferric acetylacetonate and 1,4-diazobicyclo[2.2.2]-octane in isocyanate polymerizations, and so forth. Polymerization conditions are maintained at least until solid polymer is formed.

As the foregoing has indicated, compositions provided in accordance with this invention may consist essentially of the polymer formed from the monomer as above, and the perchlorate combination in solid solution therein, in the same homogeneous phase. Such compositions are useful as fuels and monopropellants: they will burn to form energetic gases or, if confined, burn explosively.

Desirably, however, additional components will be present in compositions embodying the present invention. For example, the polymerizable systems may and often desirably will include solvents and diluents which contribute useful plasticizing action to polymeric binders in which they are included, and also may promote solubility of the perchlorate material in the system. Useful plasticizers are illustrated by amides, including amides and hydrazides such as formamide, dimethylformamide, hydrazodicarbonamide and oxaldihydrazide, N-ethyl-p-toluenesulfonamide, N-ethyl-o-toluenesulfonamide, and so forth; glycols and ethers such as ethylene glycol, triethylene glycol dimethyl ether, ethylene glycol dimethyl ether and the like; plasticizers having good fuel properties and characterized by the presence of nitro groups, such as 5,5 - dinitro - 1,2 - hexanediol, bis(2,2 - dinitropropyl)-formal, 5,5 - dinitro - 1,3 - dioxane, tris(hydroxymethyl) nitro methane, and so forth. The amount of plasticizer employed can vary up to about 35 weight percent of the polymer present in the composition but amounts of from about 15 to about 25 weight percent are generally preferred.

Also, the novel homogeneous, single-phase combinations of lithium perchlorate with polymers provided by this invention can advantageously contain metal and hydride fuels. Thus for example, the propellant compositions may contain finely divided light metals and various hydrides thereof. Examples of these are beryllium, boron, magnesium, aluminum, magnesium hydride, aluminum hydride, the various solid hydrides such as decaborane and alkylated decaboranes (ethyl alkylated decaborane), aluminum borohydride, lithium aluminum hydride, and the like. For example, the homogeneous mixture of lithium perchlorate and the polymer may contain up to about 20% by weight of the total composition of atomized aluminum (particle size about 20 microns). Preferably the aforesaid fuel material should be sufficiently fine to all pass a standard 100 mesh screen, and more preferably should pass a 200 mesh screen.

These light metal and hydride high energy additives should preferably not exceed about 25 weight percent of the total composition, since the heavy combustion exhaust tends to lower performance of the solid propellant composition. It is often desirable to incorporate not more than from 5 to about 10 weight percent of said additives based on the total weight of the propellant composition.

Another group of additives which may be included in the system as part of the solids phase comprises oxidants, and other readily decomposable materials such as explosives. Illustrative of useful oxidants are, for example, ammonium perchlorate, ammonium nitrate, additional (free, uncombined) lithium perchlorate and the like. Illustrative of useful explosive components are, for example, sodium azide.

The perchlorate containing polymeric compositions of this invention burn vigorously and relatively uniformly when ignited and are useful as a solid propellant for rockets including short range ballistic weapons such as aircraft and artillery rockets and long range strategic missiles, wherein they may be the sole propellant or be employed in one or more stages of a multi-stage rocket system. When confined the aforesaid compositions also are particularly valuable as explosives.

The invention is illustrated but not limited by the following examples in which all parts are by weight unless otherwise noted.

EXAMPLE 1

This example illustrates the formation of the lithium perchlorate complex salt with guanidine perchlorate and lower-melting eutectics of guanidine perchlorate and lithium perchlorate.

Mixtures of lithium perchlorate and guanidine perchlorate are fused, cooled and then the melting temperatures are recorded. The results, in terms of the approximate temperature below which solid phase is present in the mixture for various ratios, are as follows:

| Parts by weight | | Melting point, °C. |
|---|---|---|
| GPC | LPC | |
| 50 | 50 | 123 |
| 57.5 | 42.5 | 110 |
| 62.5 | 37.5 | 119 |
| 66.8 | 33.2 | 151 |
| 68 | 32 | 145 |
| 70 | 30 | 126.5 |
| 75 | 25 | 154 |

NOTE. –LPC=Lithium perchlorate; GPC=Guanidine perchlorate.

EXAMPLE 2

A mixture of 115 parts guanidine perchlorate and 85 parts lithium perchlorate is fused by heating at 140° C. with stirring, and then cooled to room temperature to solidify it.

The product, which is the 57.5:42.5 weight ratio eutectic, is tested for impact sensitivity by the U.S. Bureau of Mines test, and a value of 120 cm. for 50% detonation probability (2 kilogram weight) is determined.

EXAMPLE 3

Propellants with a solid solution binder and oxidized with a lithium perchlorate/guanidine perchlorate eutectic with up to 90% solids loading are prepared from the eutectic of Example 2.

The eutectic is dissolved in a fluid mixture of an acrylamide, selected from acrylamide and N,N-diethylacrylamide, ethylene glycol and N-methylmorpholine, at 85° C. Additional solids selected from lithium perchlorate and 5 micron particle size aluminum powder are mixed in. It is found that even at these solids loadings, the mixtures are readily-processable, free-flowing materials at 85° C.

Now succinic anhydride is added to the mixes to activate polymerization and the mixes are cast and maintained at 85° C., until polymerization is complete. Clear polymeric solid solutions with measured tensile strength values of above 600 p.s.i. are obtained for each of the following compositions.

| AA, percent | NNDEA, percent | EG, percent | GPC/LPC, percent | LPC, percent | AL, percent | NMM, percent | SA, percent |
|---|---|---|---|---|---|---|---|
| 7.2 | | 4.8 | 66 | | 22 | 0.5 | 0.6 |
| 9.5 | | 3.0 | 37.0 | 25.2 | 25.3 | 0.5 | 0.6 |
| 7.5 | | 5.0 | 40 | 24.65 | 22.85 | 0.5 | 0.6 |
| 7.6 | | 2.4 | 47.5 | 20.16 | 22.34 | 0.5 | 0.6 |
| | 8.0 | 2.0 | 68 | | 22 | 0.5 | 0.6 |

NOTE.—AA=Acrylamide; NNDEA=N,N-Diethylacrylamide; EG=Ethylene glycol; LPC=Lithium perchlorate; NMM=N,methylmorpholine; SA=Succinic anhydride; GPC=Guanidine perchlorate.

While the invention has been described with particular reference to specific individual preferred embodiments thereof, it will be appreciated that modifications and variations can be made without departing from the scope of the invention, which is limited only as defined in the appended claims.

What is claimed is:

1. A propellant composition comprising polymer produced by the polymerization of monomers having a functional group including a donor selected from the group consisting of oxygen, sulfur, and nitrogen and an oxidant amount of an intimate combination of guanidine perchlorate and lithium perchlorate selected from the class consisting of the 4:3 ratio guanidine perchlorate/lithium perchlorate complex salt, the 70/30 weight ratio guanidine perchlorate/lithium perchlorate eutectic melting at about 126.5° C. and the 57.5/42.5 weight ratio guanidine perchlorate/lithium perchlorate eutectic melting at about 110° C., said composition including at least sufficient oxidant to make combustion of said system self-supporting.

2. A solid solution of an oxidant amount of a combination of guanidine perchlorate and lithium perchlorate selected from the class consisting of the 4:3 molar ratio guanidine perchlorate/lithium perchlorate complex salt, the 70/30 weight ratio guanidine perchlorate/lithium perchlorate eutectic melting at about 125.6° C., and the 57.5/42.5 weight ratio guanidine perchlorate/lithium perchlorate eutectic melting at 110° C. and polymer produced by the polymerization of monomers having a functional group including a donor selected from the group consisting of oxygen, sulfur and nitrogen, said polymer and said combination being in the same homogeneous phase.

3. The product of claim 2 wherein said combination of guanidine perchlorate and lithium perchlorate of said polymeric solid solution is the 57.5/42.5 weight ratio guanidine perchlorate/lithium perchlorate eutectic and said polymer is polyacrylamide.

4. The method of forming a solid solution of a guanidine perchlorate/lithium perchlorate combination wherein said perchlorate and polymer are in the homogeneous phase which comprises polymerizing a polymerizable olefinic monomer having a functional group including a donor selected from the group consisting of oxygen, sulfur and nitrogen in the presence of a dissolved intimate combination of guanidine perchlorate and lithium perchlorate selected from the class consisting of the 4:3 molar ratio guanidine perchlorate/lithium perchlorate complex salt, the 70/30 weight ratio guanidine perchlorate/lithium perchlorate eutectic melting at about 126.5° C., and the 57.5/42.5 weight ratio guanidine perchlorate/lithium perchlorate eutectic meeting at about 110° C.

5. The method of claim 4 wherein an olefinic monomer is polymerized by addition polymerization in the presence of said dissolved perchlorate eutectics.

6. The method of claim 4 in which said olefinic monomer is an acrylamide and said eutectic is the 57.5/42.5 weight ratio eutectic.

References Cited

UNITED STATES PATENTS 3,094,444    6/1963    Hedrick et al. ____ 149—109 X

BENJAMIN R. PADGETT, Primary Examiner

U.S. Cl. X.R.

149—75, 77, 83, 109

PO-1050
(5/69)

UNITED STATES PATENT OFFICE
CERTIFICATE OF CORRECTION

Patent No. 3,531,338                     Dated  May 21, 1964

Inventor(s)  Joseph J. Byrne

It is certified that error appears in the above-identified patent and that said Letters Patent are hereby corrected as shown below:

Column 8, claim 2, line 52, "125.6°" should be --- 126.5°.  Column 9, claim 4, line 4, "meeting" should be ---melting---.

Signed and sealed this 22nd day of May 1973.

(SEAL)
Attest:

EDWARD M. FLETCHER, JR.                  ROBERT GOTTSCHALK
Attesting Officer                           Commissioner of Patents